US011169171B2

(12) United States Patent
Plancke (10) Patent No.: US 11,169,171 B2
(45) Date of Patent: Nov. 9, 2021

(54) METHOD FOR DETERMINING THE INSTANTANEOUS FREQUENCY AND PHASE OF A PERIODIC SIGNAL

(71) Applicants: Continental Automotive France, Toulouse (FR); Continental Automotive GmbH, Hannover (DE)

(72) Inventor: Sébastien Plancke, Tournefeuille (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 22 days.

(21) Appl. No.: 16/646,721

(22) PCT Filed: Sep. 25, 2018

(86) PCT No.: PCT/EP2018/076011
§ 371 (c)(1),
(2) Date: Mar. 12, 2020

(87) PCT Pub. No.: WO2019/063566
PCT Pub. Date: Apr. 4, 2019

(65) Prior Publication Data
US 2020/0271686 A1 Aug. 27, 2020

(30) Foreign Application Priority Data
Sep. 26, 2017 (FR) ...................................... 1758878

(51) Int. Cl.
*B60C 23/04* (2006.01)
*G01P 3/44* (2006.01)
*G01L 17/00* (2006.01)

(52) U.S. Cl.
CPC .............. *G01P 3/44* (2013.01); *B60C 23/041* (2013.01); *B60C 23/045* (2013.01); *B60C 23/0416* (2013.01); *G01L 17/00* (2013.01)

(58) Field of Classification Search
CPC .. G01M 17/02; G01M 17/021; G01M 17/022; G01M 17/027; G01M 17/025;
(Continued)

(56) References Cited

U.S. PATENT DOCUMENTS

2005/0156722 A1 7/2005 McCall et al.
2005/0187667 A1* 8/2005 Vredevoogd ....... B60C 23/0437
701/1

(Continued)

FOREIGN PATENT DOCUMENTS

DE 102010000919 A1 4/2011

OTHER PUBLICATIONS

International Search Report and Written Opinion for International Application No. PCT/EP2018/076011, dated Nov. 27, 2018, 9 pages.

*Primary Examiner* — Andre J Allen
(74) *Attorney, Agent, or Firm* — RatnerPrestia (57) ABSTRACT

A method for determining the instantaneous frequency and phase of a periodic signal includes: acquiring a periodic signal characteristic of the frequency to be determined and a particular point of which is characteristic of a reference of the phase of the signal; identifying, by optimization, a reference sequence in at least one consecutive portion of the signal; determining a temporal evolution of the frequency of the signal by computing a function of the lag between the identification of the reference sequence in at least one consecutive portion of the signal; determining an instant corresponding to a point characteristic of a reference of the phase of the signal in the course of the period of the signal, (Continued)

and deducing therefrom the temporal evolution of the frequency, the instantaneous phase of the signal with respect to the point characteristic of phase reference.

13 Claims, 4 Drawing Sheets

(58) Field of Classification Search
CPC .... G01M 17/024; G01M 17/10; G01M 1/045; G01M 7/08; G01M 17/0076; G01M 17/013; G01M 17/03; G01M 17/04; G01M 17/06; G01M 17/08; G01M 1/02; G01M 1/12; G01M 1/16; G01M 1/225; G01M 3/04; G01M 3/40; G01M 5/0091; G01M 7/02; G01M 99/00; G01M 99/002; B60C 23/0494; B60C 2019/004; B60C 23/0493; B60C 23/064; B60C 19/00; B60C 23/04; B60C 23/0488; B60C 23/0498; B60C 23/0496; B60C 23/0408; B60C 23/041; B60C 23/0411; B60C 23/06; B60C 23/20; B60C 11/246; B60C 23/0486; B60C 23/061; B60C 11/243; B60C 99/00; B60C 11/0083; B60C 13/003; B60C 2009/2038; B60C 23/004; B60C 23/02; B60C 23/0401; B60C 23/0406; B60C 23/0416; B60C 23/0433; B60C 23/0455; B60C 23/0459; B60C 23/0474; B60C 23/0489; B60C 23/0491; B60C 25/002; B60C 25/005; B60C 25/007; B60C 29/02; B60C 3/04; B60C 99/006; B60C 11/0332; B60C 11/24; B60C 13/001; B60C 13/02; B60C 15/0036; B60C 17/02; B60C 2009/0071; B60C 2009/2022; B60C 2200/02; B60C 2200/06; B60C 2200/065; B60C 23/00; B60C 23/001; B60C 23/003; B60C 23/007; B60C 23/008; B60C 23/0413; B60C 23/0427; B60C 23/0447; B60C 23/0454; B60C 23/0457; B60C 23/0462; B60C 23/0471; B60C 23/0472; B60C 23/0476; B60C 23/0479; B60C 23/0483; B60C 23/0484; B60C 23/065; B60C 23/066; B60C 23/10; B60C 25/0548; B60C 25/056; B60C 25/132; B60C 25/138; B60C 29/005; B60C 9/005; B60C 9/18; B60C 9/1807; B60C 9/20; B60C 9/28
USPC .................................................. 73/146–146.8
See application file for complete search history.

(56) References Cited

U.S. PATENT DOCUMENTS

| | | | |
|---|---|---|---|
| 2006/0082077 A1* | 4/2006 | Gouriet | G01M 17/04 280/5.5 |
| 2009/0144017 A1* | 6/2009 | Penot | B60C 23/0416 702/150 |
| 2011/0288720 A1* | 11/2011 | Huchard | B60C 23/0416 701/31.4 |
| 2012/0203400 A1 | 8/2012 | Schultes | |
| 2015/0006104 A1 | 1/2015 | Okada et al. | |

* cited by examiner

METHOD FOR DETERMINING THE INSTANTANEOUS FREQUENCY AND PHASE OF A PERIODIC SIGNAL

CROSS REFERENCE TO RELATED APPLICATIONS

This application is the U.S. National Phase Application of PCT International Application No. PCT/EP2018/076011, filed Sep. 25, 2018, which claims priority to French Patent Application No. 1758878, filed Sep. 26, 2017, the contents of such applications being incorporated by reference herein.

FIELD OF THE INVENTION

The invention relates to the field of signal processing, especially in the field of automotive vehicles.

More precisely, the invention relates to a method for determining the instantaneous frequency and the instantaneous phase of a periodic signal acquired by means of a vehicle sensor.

BACKGROUND OF THE INVENTION

By virtue of the system for checking the pressure of the tires (TPMS), manual pressure checks are no longer necessary, the driver being informed in real time when the pressure of one or more tires is unsuitable.

So-called direct TPMS measures the pressure of the tires by pressure sensors installed directly in the tires. These sensors measure the pressure inside the tire and transmit the information to the main computer or to the instruments on board the car.

When changing tires, if fitting summer/winter tires for example, or if changing the pressure sensor of a tire, the vehicle must detect the sensors and pair them with the TPMS system. Thus, the pressure information transmitted by a tire sensor can be linked with the position of the wheel with which said sensor is coupled.

There exist various ways, related to the model of the vehicle, of undertaking the pairing of a pressure sensor with a wheel.

For example, the training of the sensors can be done manually, through the menu of the vehicle or through a manual procedure, indicated in the vehicle's owner's manual, without having to make a journey.

The training can also be done by means of a connection with the vehicle's embedded diagnostics interface.

Finally, the training procedure can also be automatic, the sensors being recognized after a time (for example 10 minutes) of driving at a certain speed (for example between 20 and 130 km/h).

In the latter approach, schemes are known which are aimed at correlating a signal at the level of a pressure sensor with a signal read off at the level of a wheel by ABS or ESP sensors. It is thus sought to identify the frequency and phase parameters of the pressure sensor signal and to match these characteristics with the signal of the wheel sensors. Among these schemes are approaches based on frequency analysis, training, autocorrelation, etc.

These current techniques are difficult to implement for real-time applications, since they require significant computational loads and/or significant reactivity, which are unsuited to the dynamic variation of the characteristics of the pressure sensor signal.

SUMMARY OF THE INVENTION

Therefore a need exists to allow real-time estimation of the frequency and of the phase of a periodic signal acquired by means of a sensor with an acceptable level of precision, a low processor load, and sufficient reactivity, especially so as to undertake, for example, fast location of the pressure sensors of a vehicle, for example by way of a signal acquired by means of a pressure sensor.

The present invention pertains according to a first aspect to a method for determining the instantaneous frequency and the instantaneous phase of a periodic signal comprising the steps consisting in:

acquiring a periodic signal characteristic of the frequency to be determined and a particular point of which is characteristic of a reference of the phase of the signal;

identifying a reference sequence in at least one portion of said signal;

determining the temporal evolution of the frequency of the signal by computing a function of the lag between the identification of the reference sequence in at least one consecutive portion of the signal;

determining an instant corresponding to a point characteristic of a reference of the phase of the signal in the course of the period of said signal, and deducing, from the temporal evolution of the frequency, the instantaneous phase of the signal with respect to the point characteristic of phase reference.

Advantageously, but optionally, the determination method according to an aspect of the invention can furthermore comprise at least one of the following characteristics:

the particular point characteristic of a reference of the phase of the signal is an extremum of said signal;

the step of identifying the reference sequence comprises the determination of the minimum of an optimization function;

the optimization function comprises, in a given time window, the computation of a function of the difference between the values of the reference sequence and the values of a portion of the signal of same size as the size of the reference sequence;

the computation is stopped when the function of the difference between the values of the reference sequence and the values of the portion of the signal of same size is greater than a threshold value;

the reference sequence corresponds to a portion of the signal exhibiting a difference of amplitude between a minimum value and a maximum value of this signal portion greater than a given threshold;

the method comprises a step of filtering the periodic signal;

the method comprises after the computation of the phase of the signal, the correction of the phase of the filtered signal;

the correction of the phase of the filtered signal is carried out by another step of so-called "backward" filtering.

According to a second aspect, the invention pertains to a method for locating a pressure sensor in a system for monitoring the pressure of the tires of the wheels of a vehicle, comprising:

at least one sensor module disposed in each tire of the plurality of wheels comprising a pressure sensor of said tire;

a wheel speed sensor positioned in proximity to each of the wheels, and configured to transmit data representative of the orientation of each wheel, a location module configured to receive data transmitted by the sensor module and the speed sensors of the wheels;

said sensor module being configured to implement the steps of said method for identifying the instantaneous frequency and the instantaneous phase of a periodic signal, and consisting in:
  transmitting to the location module data relating to the temporal evolution of the frequency at an instant Ttrans corresponding to a point characteristic of a reference of the phase of the signal and to the reference angular position of the sensor module; and
said location module being configured to implement the steps consisting in:
  computing the angular speed and the angular position of the plurality of wheels on the basis of the data representative of the orientation of the wheel;
  evaluating the angular position of each wheel at the instant Ttrans for a plurality of transmissions of data of the sensor module and for each wheel, determining an angular error through the difference of angle between the reference angular position of the sensor module and between said angular position of a wheel;
  associating the sensor module with a wheel for which the variation of the angular error, for a plurality of transmissions of data of the sensor module, is minimal.

Advantageously, but optionally, the location method according to an aspect of the invention can furthermore comprise at least one of the following characteristics:
  the point characteristic of a reference of the phase of the signal is an extremum of said signal;
  the signal of the sensor module is a signal of temporal variation of an electromagnetic field;
  the reference signal is determined at the level of the pressure sensor.

According to a third aspect, the invention relates to a system for monitoring the pressure of the tires of the wheels of a vehicle comprising a module for locating a tire pressure sensor, a plurality of sensor of pressure of tires, a plurality of sensor of wheels, a plurality of means of transmission to said locating module of a pressure sensor and/or wheel sensor signal, said module being configured for the implementation of a method such as defined in the previous characteristics.

BRIEF DESCRIPTION OF THE DRAWINGS

Other characteristics and advantages will become apparent on reading the description which follows of an embodiment. This description will be given with reference to the appended drawings in which.

DETAILED DESCRIPTION OF THE PREFERRED EMBODIMENTS

An aspect of the invention relates more generally to a method for determining the instantaneous frequency and the instantaneous phase of a periodic signal acquired by means of a sensor of an automotive vehicle.

A mode of implementation of an aspect of the invention, using said method for determining the instantaneous frequency and the instantaneous phase of a periodic signal, relates to a method for locating a pressure sensor in a system for monitoring the pressure of the tires of the wheels of a vehicle. This method is implemented by a tire pressure sensor location module.

Figure 1:
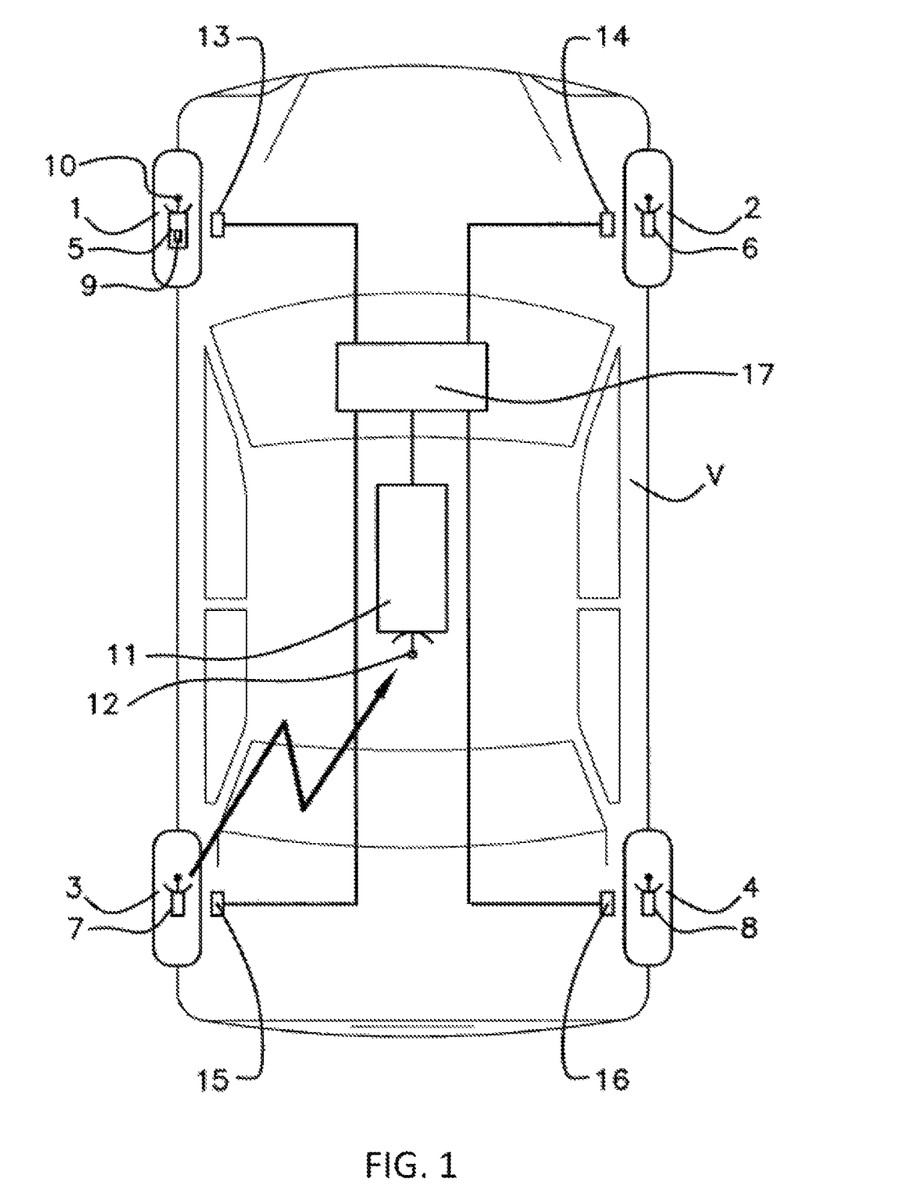
FIG. 1 illustrates a system for monitoring the pressure of the tires of the wheels of a vehicle.

A system for monitoring the pressure of the tires of the wheels 1-4 of a vehicle V has been represented in FIG. 1.

The monitoring system comprises a plurality of sensor modules 5-8. A sensor module 5-8 is associated with each wheel 1-4, and for example fastened on the rim of said wheel so as to be positioned inside the casing of the tire.

Each of the sensor modules 5-8 integrates sensors dedicated to the measurement of the parameters of the tires, connected to a microprocessor-based computation unit linked to an emitter 10.

The sensor modules 5-8 are configured to emit these wheel parameters (pressure, temperature, etc.) to a system for monitoring pressure, preferably by radiofrequency.

The sensor modules 5-8 also comprise means for receiving low-frequency radio signals, consisting of a coil.

The sensor module 5-8 comprises measurement means 9 for measuring a periodic signal representative of the electrical voltage generated in the coil of a means for receiving low-frequency signals, and corresponding to the temporal variation of an electromagnetic field (EMF signal).

This signal is therefore correlated with the speed of the wheel and with the angular position of a wheel with which the sensor module 5-8 and the tire are coupled.

The sensor module can also comprise means for measuring other types of periodic signals that may be obtained on the tire, such as a pressure signal, displacement signal, deformation signal, etc.

Furthermore, the sensor module 5-8 comprises processing means, typically a processor, as well as a memory.

The monitoring system also comprises a sensors location module 11 situated in the vehicle V, comprising a microprocessor and integrating a receiver 12 able to receive the signals emitted by the emitters 10 of each of the sensor modules 5-8.

The location module 11 can be disposed in an electronic control unit (ECU).

The vehicle V is also equipped with an active safety system such as an "ABS" anti-lock wheel braking system, or an "ESP" system for dynamic control of stability. Such systems comprise a plurality of wheel speed sensors 13-16 positioned on the vehicle V, at least one sensor being positioned in proximity to each wheel 1-4, and adapted to provide, in the form of values that can be converted into angular values, data representative of the orientation of said wheel.

Moreover, this active safety system comprises an "ABS" or "ESP" computer 17 which is linked to the various wheel speed sensors 13-16 so as to receive the wheel speed information measured by said sensors and is programmed to anticipate the regulations intended to avoid the locking of the wheels 1-4. In the usual way, the wheel speed sensors 13-16 consist of inductive, magneto-resistive or Hall-effect sensors, adapted to measure the rotation speed of each wheel 1-4 on a toothed or magnetic wheel.

The signals are transmitted for example through a wired link between the ABS sensors and the location module. This link may be of CAN bus type.

Figure 2:
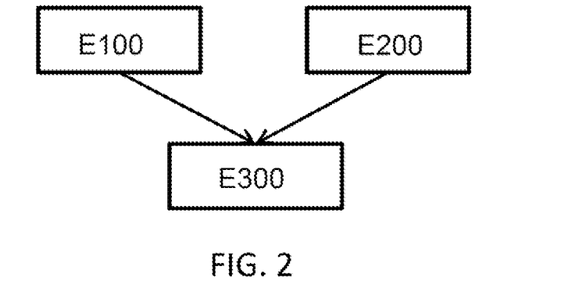
FIG. 2 represents sub-steps of a method with a view to the location of each sensor module disposed on each of the wheels of a vehicle.

Steps of a method with a view to the location of each sensor module 5-8 disposed on each of the wheels 1-4 of the vehicle V have been represented with reference to FIG. 2.

The method is described for a sensor module of a wheel, it being understood that said method is performed for each of the sensor modules.

Step E100 allows the determination of certain physical characteristics of a signal measured by a sensor module 5-8.

Figure 3:
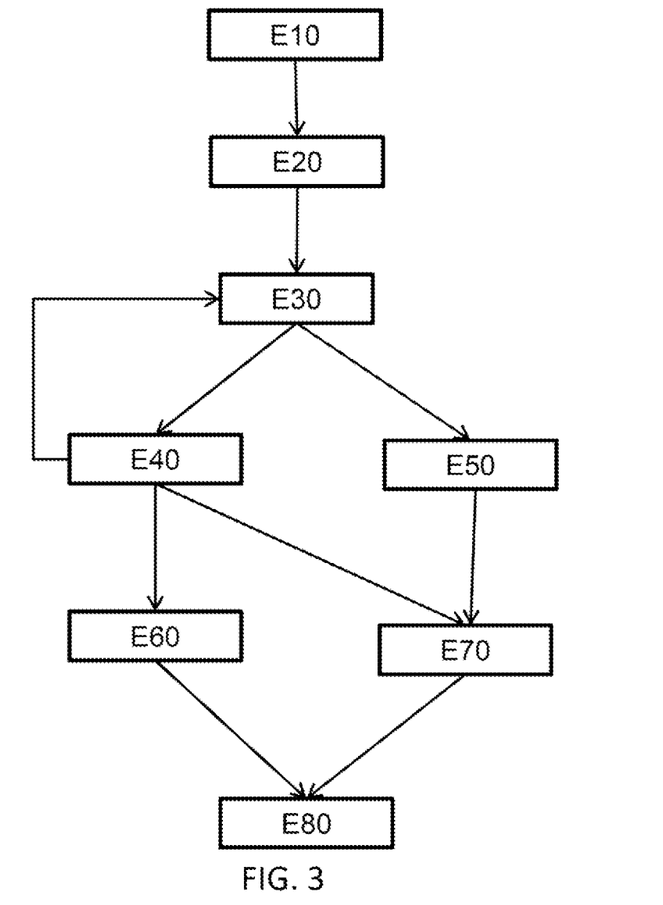
FIG. 3 represents sub-steps of a method with a view to the location of each sensor module disposed on each of the wheels of the vehicle V.

Sub-steps of step E100 have been represented with reference to FIG. 3.

In a step E10, at an instant T0, the sensor module 5-8 of a wheel 1-4 performs the acquisition of an analog periodic signal S1. The latter is advantageously correlated with the speed and with the angular position of the wheel with which the sensor module 5-8 and the tire are coupled. For example, the signal S1 corresponds to a periodic signal representative of the electrical voltage generated in the coil.

Figure 4:
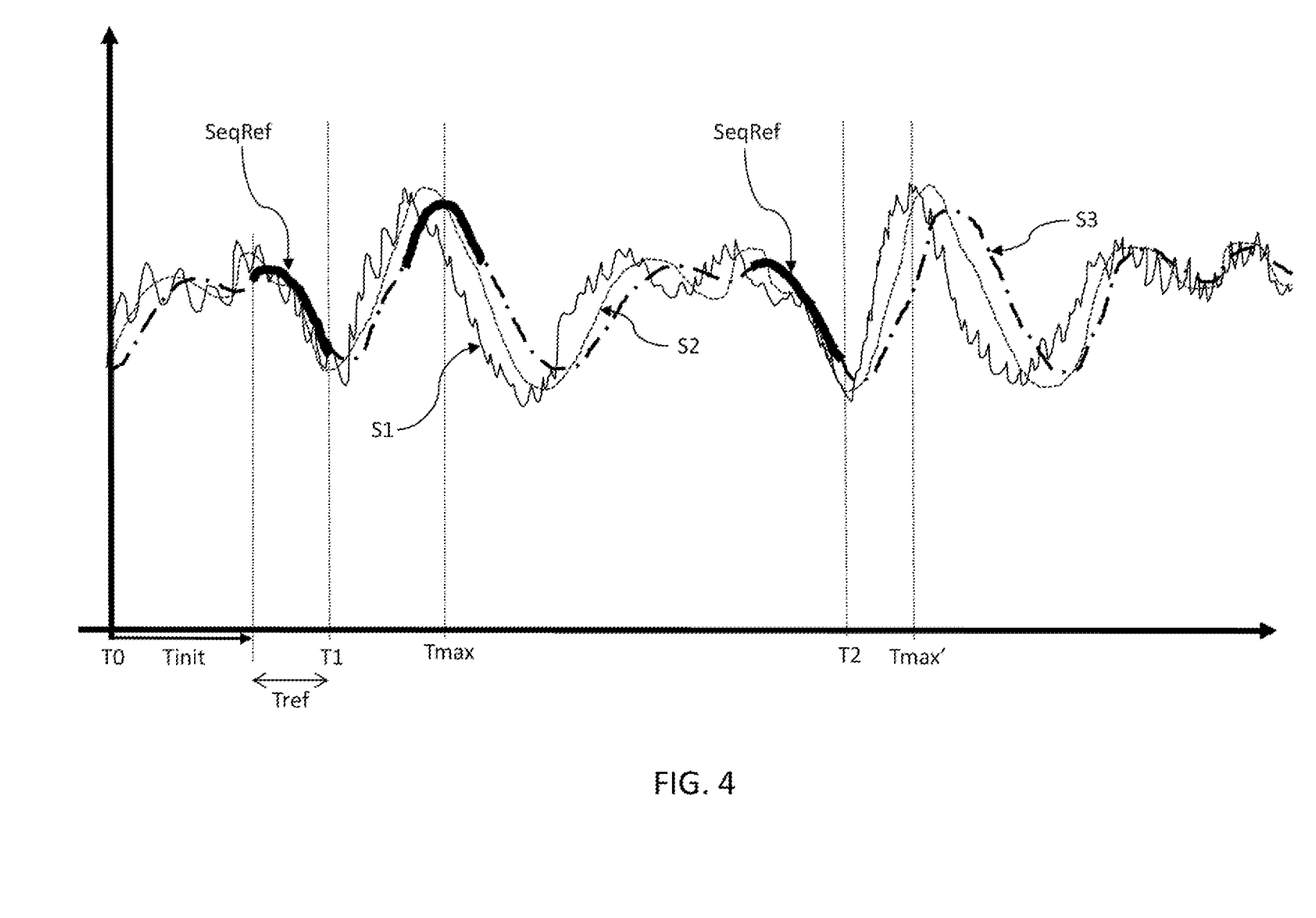
FIG. 4 represents a scheme for processing an acquisition signal of a sensor module.

A scheme for processing this signal S1 is represented in FIG. 4. Thus, the measured signal S1 is thereafter filtered in an analog manner in a step E20, for example by an antialiasing filter to produce an analogically filtered signal S2. In a particular embodiment, the measured signal S1 can be amplified, prior to step E20.

In a step E30, this signal S2 is sampled. A digital filter is initialized on the basis of predetermined parameters and the sampled signal S2 is digitally filtered, making it possible to obtain a digitally filtered input signal S3. The initialization lag of the digital filtering corresponds to a time Tinit.

Subsequently, in a step E40, following the lag Tinit, and during a period Tref, for example of a second, the signal S3 is analyzed to determine an amplitude span of said signal S3 (min, max). In an advantageous manner, the period Tref is equal to the period of the lowest frequency of the signal S3 that one wishes to determine (e.g.: 0.5 s for a frequency of 2 Hz). Said span is thereafter used to select a reference sequence SeqRef, lying in said span, of the signal S3. The amplitude span is determined on the basis of the amplitude resolution and of the minimum frequency that it is sought to identify and of the shape of the signal S3, in such a way that the number of samples of the analyzed signal S3 is not too small, so as to avoid choosing too fine a detail of the signal S3, which would give rise to false detections of the reference sequence. The amplitude span is also determined in such a way that the number of samples of the analyzed signal is not too high so as to make sure of a relevant selection of the reference sequence SeqRef, so that the latter can be recognized in the signal S3.

After the determination of the reference portion SeqRef, the latter is then stored in memory.

The end of the period Tref, defines an instant T1, where a new series of samples of the signal S3 is selected and then compared with the reference sequence Seq Ref.

Figure 5:
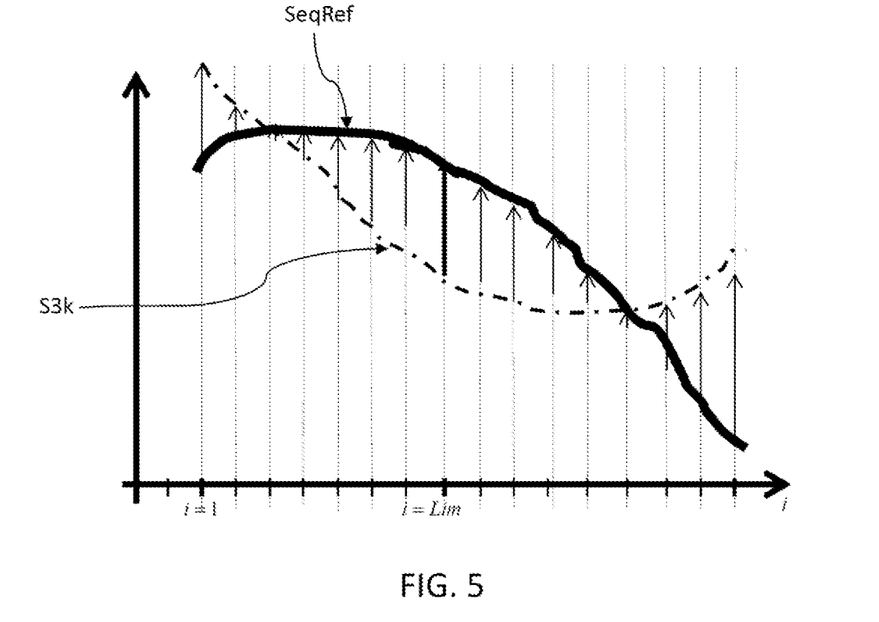
FIG. 5 illustrates a scheme for recognizing a reference sequence in an acquisition signal of a sensor module.

The comparison is performed on a minimum of samples of the reference sequence SeqRef and of the signal S3, in such a way as to optimize the computational load. Such a comparison is illustrated in FIG. 5.

This comparison makes it possible to identify the reference sequence SeqRef in the signal S3 through a cost optimization function, typically through a quadratic criterion, such as the least squares scheme, whose minimum is determined.

Thus, at a given instant tk, the sensor module computes a cost function over a number of samples N. At each instant tk of the signal S3, a window of N samples is therefore defined, with N ideally equal to the number of samples of the reference sequence SeqRef, and where samples of the signal are compared with the samples of said reference sequence.

In a particular embodiment, the cost function is computed over a sequence S3$k$ of a minimum of 24 samples. In the case where the samples are separated by 3 ms, the cost function is therefore computed over a period of 72 ms.

For example, the cost function is computed for a set of samples i (0<i≤N), through the following formula:

$$J_{Lim}^{k} = \sum_{i=1}^{Lim} (S_i^{ref} - S3_i^k)^2.$$

In one embodiment, for a predetermined value of i, i=Lim, with Lim for example equal to modulo (N/2), the value of the cost function is compared with a predetermined threshold $J_{max}$. This threshold is defined to allow a minimum detection of the reference sequence, while avoiding detection errors (recognition of non-corresponding portions of signal of the S3 although they resemble SeqRef). Thus, said threshold can be determined on the basis of the resolution in amplitude and in time of the minimum and maximum frequency that it is sought to identify and of the shape of the signal S3. The threshold is therefore sufficiently large to take the numerical errors into account.

Thus, if the comparison is such that $J_{Lim}^k > J_{max}$, the computation at the instant tk is stopped. This intermediate computation therefore makes it possible to avoid the computation over all the samples of the signal, and consequently to reduce the use of processor resources in the case where the computation makes it possible to determine that the reference sequence cannot be recognized in the sequence S3$k$.

If the computation is performed over the N samples, the final result is compared with the threshold Jmax. If the result is higher, a minimum value of the cost function has not been determined, the computation is repeated at an instant tk+1. In the converse case, this result corresponds to the minimum of the function.

In one embodiment, when a minimum is determined, the threshold $J_{max}$ is updated by utilizing this minimal value.

In a step E60, the determination of the minimum makes it possible to deduce an instant T2 of recognition of the reference sequence, and therefore thereafter to compute the period of the signal S3 by the time period defined between the instants T1 and T2. Likewise, the frequency of the signal S3 is also deduced.

In another embodiment, the identification of the frequency of the signal S3 is performed by two successive identification sequences. Thus, subsequent to an instant T2, an instant T3 (not represented), of recognition of a new reference sequence is determined. Thus, when an instant T2 is found, on the basis of a reference sequence defined at the instant T1, this reference sequence is updated at the instant T2 and will therefore be used to determine the instant T3. The determination of these various instants T1, T2, and T3 allows the computation of the linear variation of the frequency and of the quadratic variation of the phase.

An angular position of the wheel at an instant t is then defined by:

$$\varphi(t) = 2\pi \cdot \lfloor a \cdot (t-T_1)^2 + b \cdot (t-T_1) + c \rfloor$$

The coefficients are computed by matching:

$$\begin{Bmatrix} a \\ b \\ c \end{Bmatrix} = \begin{bmatrix} 0 & 0 & 1 \\ (T_2-T_1)^2 & (T_2-T_1) & 1 \\ (T_3-T_1)^2 & (T_3-T_1) & 1 \end{bmatrix}^{-1} \begin{Bmatrix} 0 \\ 1 \\ 2 \end{Bmatrix}$$

An angular position is then deduced therefrom and will serve as reference:

$$\varphi(T_{max}) = 2\pi \cdot \lfloor a\cdot(T_{max}-T_1)^2 + b\cdot(T_{max}-T_1) + c \rfloor$$

In parallel with the reference sequence recognition detection steps, the sensor module 5-8 determines, in a step E50 from the instant T2, a maximum (or minimum) value of the signal S3, up to the instant T3.

This value and the instant of detection Tmax are stored in memory.

In one embodiment, the time period between the instant of detection of said value and the instant of detection of the repetition of said value is used to allow a verification of the period of the signal determined in step E40.

The instant of detection Tmax is used to know, on the basis of the signal S3, the corresponding instant in the signal S1. Indeed, the analog and digital filterings have introduced a phase shift of the signals S2 and S3 with respect to S1. Through the knowledge of the applied filters, the phase shift introduced by the various filters is known.

Thus, in a so-called "backward" filtering step E70, the sensor module 5-8 digitally filters the samples corresponding to a particular point of the signal, for example the extremum, by using the analog and digital filters used previously, in the opposite sense to the time axis, that is to say from the future sample toward the past sample, so as to correct the respective phase shifts R1 and R2 introduced by the previous filters. In this step, also illustrated in FIG. 6, the sensor module 5-8 thus determines a new extremum, corresponding to an extremum at an instant Tmax' of the measured signal S1.

Figure 6:
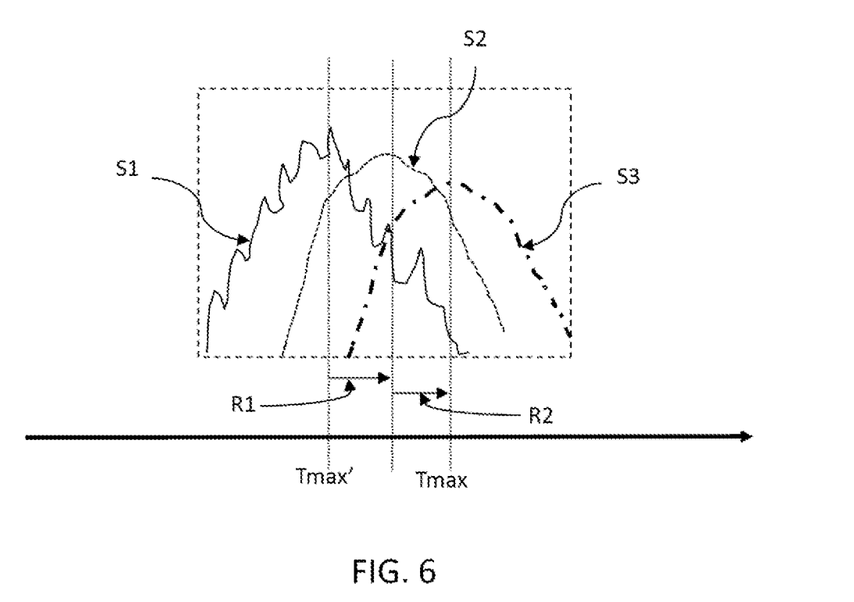
FIG. 6 represents a scheme for determining a particular point corresponding to the extremum of an acquisition signal of a sensor module.

Next, from an instant T3, starting a new period of the signal S3, said module deduces precisely therefrom the phase of the next new extremum.

Indeed, in the case of a signal S1 of EMF type, by knowing the position of the power supply coil of the sensor module 5-8 with respect to a reference angular position (an "origin") and knowing that the extrema of the signal S1 are obtained for predetermined positions of the sensor module 5-8, it is therefore possible to determine the phase of the signal S1 with respect to the origin.

In one embodiment where the data are emitted at a constant angular position (of reference), the instant "t" of emission, corresponding to the next maximum, is then sought:

$$\varphi(t) = \varphi(T_{max}) + 2\pi = 2\pi \cdot \lfloor a\cdot(t-T_1)^2 + b\cdot(t-T_1) + c + 1 \rfloor$$

In an alternative embodiment, the data are emitted irrespective of the angular position. Thus, the information regarding relative phase with respect to the maximum is dispatched: $\varphi(T_3) - \varphi(T_{max})$.

In this configuration, it is not necessary to emit the data at fixed angle, the location module 11 being capable of compensating the difference of angle.

In a step E80, data relating to the frequency of the signal S1 are emitted by the sensor module 5-8 at a predetermined position of the sensor destined for the location module 11. Ideally, the position corresponds to the instant of maximum or minimum value of the signal S1.

The data are therefore emitted at a constant position (reference position) of the sensor with respect to the origin position at each revolution of the wheel. The sensor module 5-8 can also transmit a datum allowing its identification.

The sensor location module 11 is, for its part, configured for the reception of the data emitted by the plurality of sensor module 5-8.

In parallel, in a step E200, the wheel speed sensors 13-16 of the ABS/ESP systems (or the centralized ABS/ESP computer) output to the computer 17 data representative of the orientation of the associated wheels 1-4, in the form of values that can be converted into angular values (tooth number of the toothed wheel, etc.). Being an active safety system, the emission time of these signals is markedly lower than that of the sensor modules 5-8, for example of the order of 10 ms to 20 ms.

The sensor location module 11 is, for its part, configured to gather the values transmitted by the computer 17 and to transform the values measured at various successive instants into corresponding angular values.

For each instant of transmission of data of a sensor module 5-8, in a step E300, the location module 11 compares the angular value with respect to the reference position of the sensor module 5-8 (the phase of the signal S1) with an angular value corresponding to the same instant of transmission for each wheel 1-4 so as to allow the computation of an angular error between a sensor module and a wheel.

This computation is repeated and spaced over time. In one embodiment, the values are compared at least ten times or so, just once per period, two successive comparisons being spaced apart by ten seconds or so.

The comparison computation being repeated over time, and the wheels mutually desynchronizing, a single wheel keeps the same difference of angle, angular error, with the sensor over time. Said wheel 1-4, for which the variation of angular error is minimal over various time periods, will therefore be associated with the sensor module 5-8.

The location method according to the above-described aspect of the invention presents the advantage of constituting a very effective method in terms of reactivity and reliability. Thus, this method adapts to the shapes of signals specific to each wheel environment.

The method also allows, through a deterministic approach, precise estimation of the frequency and phase of a signal correlated with the speed of a wheel and with the angular position of a wheel to which the tire is coupled.

The invention claimed is:

1. A method for locating a pressure sensor in a system for monitoring the pressure of the tires of the wheels of a vehicle comprising:
   at least one sensor module disposed in each tire of the plurality of wheels comprising a pressure sensor of said tire;
   a wheel speed sensor positioned in proximity to each of the wheels, and configured to transmit data representative of an orientation of each wheel,
   a location module configured to receive data transmitted by the sensor module and the speed sensors of the wheels;
   said sensor module being configured to undertake identification of an instantaneous frequency and of an instantaneous phase of a periodic signal, and comprising:
      transmitting to the location module data relating to a temporal evolution of the frequency at the instant Ttrans corresponding to a point characteristic of a reference of the instantaneous phase of the signal and to a reference angular position of the sensor module; and said location module being configured to implement the steps comprising:

computing an angular speed and an angular position of the plurality of wheels on the basis of data representative of the orientation of the wheel;

evaluating the angular position of each wheel at an instant Ttrans for a plurality of transmissions of data of the sensor module and for each wheel, determining an angular error through a difference of angle between the reference angular position of the sensor module and between said angular position of a wheel;

associating the sensor module with a wheel for which a variation of the angular error, for a plurality of transmissions of data of the sensor module, is minimal;

the determination of the instantaneous frequency and of the instantaneous phase of the periodic signal comprising:

acquiring a periodic signal characteristic of the frequency to be determined and a portion of which is characteristic of a reference of the phase of said signal;

identifying a reference sequence in at least one consecutive portion of said signal;

determining a temporal evolution of the frequency of the signal by computing a function of a lag between the identification of the reference sequence in at least one consecutive portion of the signal; and determining an instant corresponding to a point characteristic of a reference of the phase of the signal in the course of the period of said signal, and deducing therefrom the temporal evolution of the frequency, the instantaneous phase of the signal with respect to the point characteristic of phase reference.

2. The method for locating a tire pressure sensor as claimed in claim 1, in which the point characteristic of a reference of the phase of the signal is an extremum of said signal.

3. The method for locating a tire pressure sensor as claimed in claim 2, in which the signal of the sensor module is a signal of temporal variation of an electromagnetic field.

4. The method for locating a tire pressure sensor as claimed in claim 1, in which the reference signal is determined at a level of the pressure sensor.

5. The method for locating a tire pressure sensor as claimed in claim 1, in which an identification of the reference sequence comprises the determination of a minimum of an optimization function.

6. The method for locating a tire pressure sensor as claimed in claim 5, in which the optimization function comprises, in a given time window, computation of a function of a difference between values of the reference sequence and values of a portion of the signal of same size as the size of the reference sequence.

7. The method for locating a tire pressure sensor as claimed in claim 6, in which the computation is stopped when the function of the difference between the values of the reference sequence and the values of the portion of the signal of same size is greater than a threshold value.

8. The method for locating a tire pressure sensor as claimed in claim 1, in which the particular point characteristic of a reference of the phase of the signal is an extremum of said signal.

9. The method for locating a tire pressure sensor as claimed in claim 1, in which the reference sequence corresponds to a portion of the signal exhibiting a difference of amplitude between a minimum value and a maximum value of this signal portion greater than a given threshold.

10. The method for locating a tire pressure sensor as claimed in claim 1, in which the method further comprises filtering the periodic signal.

11. The method for locating a tire pressure sensor as claimed in claim 1, in which the method further comprises after the computation of the phase of the signal, correcting the phase of the filtered signal.

12. The method for locating a tire pressure sensor as claimed in claim 11, in which the correction of the phase of the filtered signal is carried out by backward filtering.

13. A system for monitoring the pressure of the tires of the wheels of a vehicle comprising a module for locating a tire pressure sensor, a plurality of sensor of pressure of tires, a plurality of sensor of wheels, a plurality of means of transmission to said locating module of a pressure sensor and/or wheel sensor signal, said module being configured for the implementation of the method of claim 1.

* * * * *